(12) United States Patent
Hesselbrock et al.

(10) Patent No.: US 10,973,364 B2
(45) Date of Patent: Apr. 13, 2021

(54) METHOD AND AN APPARATUS FOR PREPARING A BREWED BEVERAGE

(71) Applicant: MELITTA SINGLE PORTIONS GMBH & CO. KG, Minden (DE)

(72) Inventors: Katrin Hesselbrock, Osnabrueck (DE); Sven Neuhaus, Bad Oeynhausen (DE); Jan Pahnke, Minden (DE); Gerold Schandl, Minden (DE); Robert Köhler, Ober-Ramstadt (DE); Markus Ungerer, Mühltal (DE); Thomas Weber, Mühltal (DE)

(73) Assignee: MELITTA SINGLE PORTIONS GMBH & CO. KG, Minden (DE)

( * ) Notice: Subject to any disclaimer, the term of this patent is extended or adjusted under 35 U.S.C. 154(b) by 272 days.

(21) Appl. No.: 15/325,438

(22) PCT Filed: Jun. 3, 2015

(86) PCT No.: PCT/EP2015/062360
§ 371 (c)(1),
(2) Date: Jan. 10, 2017

(87) PCT Pub. No.: WO2016/005111
PCT Pub. Date: Jan. 14, 2016

(65) Prior Publication Data
US 2017/0164780 A1    Jun. 15, 2017

(30) Foreign Application Priority Data
Jul. 11, 2014   (DE) .................. 10 2014 109 760

(51) Int. Cl.
*A47J 31/36* (2006.01)

(52) U.S. Cl.
CPC ......... *A47J 31/3638* (2013.01); *A47J 31/369* (2013.01); *A47J 31/3633* (2013.01)

(58) Field of Classification Search
CPC .. A47J 31/3633; A47J 31/3638; A47J 31/369; A47J 31/46
(Continued)

(56) References Cited

U.S. PATENT DOCUMENTS

| 5,303,639 A | 4/1994 | Bunn et al. |
| 6,805,041 B2 | 10/2004 | Colston et al. |

(Continued)

FOREIGN PATENT DOCUMENTS

| CN | 201282920 Y | 8/2009 |
| CN | 101832121 A | 9/2010 |

(Continued)

OTHER PUBLICATIONS

Merriam-Webster definition of "mechanism".*
(Continued)

*Primary Examiner* — Erin E McGrath
(74) *Attorney, Agent, or Firm* — FisherBroyles, LLP; Robert Kinberg

(57) ABSTRACT

An apparatus for preparing a brewed beverage includes a device for heating and delivering water, a brewing chamber, into which the heated water is introduced, a positioning device for positioning a capsule, with contents for brewing the beverage, at a lateral opening of the brewing chamber, and an outlet with a switchable valve on an underside of the brewing chamber, wherein an inlet for introducing the hot water is provided on an upper side of the brewing chamber. A method is also described for preparing a brewed beverage.

13 Claims, 10 Drawing Sheets

(58) Field of Classification Search
USPC ..... 99/295, 304, 307, 308, 310, 323, 289 R, 99/289 T, 289 D, 289 P
See application file for complete search history.

(56) References Cited

U.S. PATENT DOCUMENTS

| | | | |
|---|---|---|---|
| 7,681,491 | B2 | 3/2010 | Agon et al. |
| 8,091,469 | B2* | 1/2012 | Cahen ................. A47J 31/4482 99/279 |
| 8,178,139 | B2 | 5/2012 | Versini |
| 8,210,097 | B2* | 7/2012 | Versini ............... B65D 85/8043 99/295 |
| 9,382,063 | B2 | 7/2016 | Van Belleghem et al. |
| 2005/0132892 | A1 | 6/2005 | Hall |
| 2006/0230941 | A1* | 10/2006 | Ryser .................. A47J 31/3676 99/275 |
| 2010/0018404 | A1 | 1/2010 | Villa et al. |
| 2010/0116142 | A1* | 5/2010 | Versini ................ A47J 31/3628 99/295 |
| 2010/0147155 | A1* | 6/2010 | Rapparini ........... A47J 31/3666 99/281 |
| 2011/0265659 | A1 | 11/2011 | Giua |
| 2012/0180741 | A1 | 7/2012 | Strey et al. |
| 2012/0187122 | A1* | 7/2012 | Glasow .................... B65B 7/16 220/214 |
| 2012/0272830 | A1 | 11/2012 | Gugerli |
| 2012/0285334 | A1 | 11/2012 | DeMiglio et al. |
| 2012/0328744 | A1 | 12/2012 | Nocera |
| 2013/0177677 | A1* | 7/2013 | Ozanne .............. B65D 85/8043 426/115 |
| 2014/0130680 | A1 | 5/2014 | Fin et al. |
| 2014/0150666 | A1 | 6/2014 | Fin et al. |
| 2015/0238039 | A1 | 8/2015 | Fischer et al. |
| 2015/0246768 | A1* | 9/2015 | Talon .................. A47J 31/0668 426/79 |
| 2015/0368033 | A1* | 12/2015 | Krug ..................... A47J 31/407 426/112 |
| 2017/0164780 | A1 | 6/2017 | Hesselbrock et al. |

FOREIGN PATENT DOCUMENTS

| | | |
|---|---|---|
| CN | 101862121 A | 10/2010 |
| CN | 102066212 A | 5/2011 |
| CN | 103040357 A | 4/2013 |
| CN | 103648341 A | 3/2014 |
| DE | 2432141 A1 | 1/1976 |
| DE | 693 17 455 T2 | 7/1998 |
| DE | 601 03 767 T2 | 7/2005 |
| DE | 10 2006 043 903 B3 | 2/2008 |
| DE | 10 2009 048233 A1 | 4/2010 |
| DE | 11 2012 001 531 T5 | 12/2013 |
| DE | 10 2012 108 653 A1 | 2/2014 |
| DE | 20 2012 012 851 U1 | 3/2014 |
| EP | 2112093 A1 | 10/2009 |
| EP | 2119385 B1 | 11/2009 |
| EP | 2159167 A1 | 3/2010 |
| EP | 2211670 B1 | 8/2010 |
| EP | 2276380 B1 | 1/2011 |
| EP | 2112093 B8 | 11/2012 |
| EP | 2543290 A1 | 1/2013 |
| EP | 2543291 A1 | 1/2013 |
| FR | 2908970 A1 | 5/2008 |
| JP | 2009-511143 A | 3/2009 |
| JP | 2011-522567 A | 8/2011 |
| WO | 2011/077349 A2 | 6/2011 |
| WO | 2013008140 A2 | 1/2013 |
| WO | 2014/206991 A1 | 12/2014 |

OTHER PUBLICATIONS

Merriam-Webster definition of "machinery".*
Merriam-Webster definition of "extend".*
English Translation of German Search Report for DE 10 2014 109 760.2, dated Mar. 10, 2015.
International Search Report for PCT/EP2015/062360, dated Sep. 16, 2015, and English Translation thereof.
Written Opinion for PCT/EP2015/062356, dated Sep. 16, 2015, and English Translation thereof.
German Search Report for DE 10 2014 109 760.2, dated Mar. 10, 2015.
Search Report dated Jul. 9, 2018 for European Patent Application No. 18 17 0003.
Search Report completed Jul. 28, 2017 for Singapore Patent Application No. 11201610833R.
Office Action dated Mar. 11, 2019, in Japanese Patent Application No. 2017-502717.
Chinese Search Report in corresponding Chinese Patent Application No. 2015800372609, date unknown, 2 pages.
English Translation of German Search Report for DE 10 2014 109 71.0, dated Mar. 10, 2015.
International Search Report for PCT/EP2015/062361, dated Aug. 7, 2015, and English Translation thereof.
Written Opinion for PCT/EP2015/062361, dated Aug. 7, 2015, and English Translation thereof.
German Search Report for DE 10 2014 109 761.0, dated Mar. 10, 2015.
First Chinese Office Action in related Chinese Patent Application No. 201580037684.5, dated Jan. 4, 2019, 9 pages.
Second Chinese Office Action in related Chinese Patent Application No. 201580037684.5, dated Aug. 6, 2019, 10 pages.
Third Chinese Office Action in related Chinese Patent Application No. 201580037684.5, dated Jan. 13, 2020, 11 pages.
Fourth Chinese Office Action in corresponding Chinese Patent Application No. 201580037684.5, dated Apr. 24, 2020, 7 pages English Translation.
Korean Search Report in corresponding Korean Patent Application No. UAE/P/ 130712016, date unknown, 10 pages in English.

* cited by examiner

METHOD AND AN APPARATUS FOR PREPARING A BREWED BEVERAGE

CROSS-REFERENCE TO RELATED APPLICATIONS

This application is a U.S. National Stage Application of International Patent Application No. PCT/EP2015/062360, filed Jun. 3, 2015, which claims benefit of German Patent Application No. 10 2014 109 760.2, filed Jul. 11, 2014.

TECHNICAL FIELD

The present invention relates to an apparatus for preparing a brewed beverage, comprising a device for heating and delivering water, a brewing chamber, into which the heated water is introduced, a positioning device for positioning a capsule, having an ingredient for brewing a beverage, at a lateral opening of the brewing chamber, and an outlet with a switchable valve on a bottom side of the brewing chamber, as well as a method for preparing a brewed beverage.

BACKGROUND OF THE INVENTION

EP 2 119 385 discloses a brewing unit for brewing a capsule, in which a capsule is fixed to retaining elements via a closure mechanism. The capsule is pierced during the brewing process and then brewed under pressure. Such brewing units are not capable of producing tea because the brewing unit operates with high pressure and no infusion time is provided.

An apparatus for producing a brewed beverage has therefore been disclosed in EP 2 159 167, in which the capsule is arranged adjacent to a brewing chamber in which the brewed beverage can remain for a specific infusion time. The capsule is pierced on the rear side for the brewing process and a liquid is then injected via a needle, which can then flow through a screen on a side of the capsule into the brewing chamber. This brewing apparatus can operate in a substantially pressureless manner and can also be used for producing tea. It is disadvantageous however that the capsule is damaged by being piercing and leakage flows can occur at a specific filling level. Furthermore, tea can adhere to the tip protruding into the capsule, which soils the brewing chamber and optionally the brewing beverage for the next brewing process.

SUMMARY OF THE INVENTION

It is therefore the object of the present invention to provide an apparatus and a method for preparing a brewed beverage which offer optimised water guidance and avoid the aforementioned disadvantages.

This and other objects are achieved by an apparatus for preparing a brewed beverage which, in one embodiment, includes: a device to produce heated water and to convey the heated water; a brewing chamber including a lateral opening, a bottom side and an upper side including an inlet through which the heated water is introduced into the brewing chamber; a positioning device for positioning a capsule with an ingredient for brewing a beverage at the lateral opening of the brewing chamber; and an outlet including a switchable valve on the bottom side of the brewing chamber.

The object is also achieved by a method for preparing a brewed beverage which, in one embodiment, includes the following steps: positioning a capsule with an ingredient for brewing the beverage at a lateral opening of a brewing chamber; heating water and conveying the heated water to the brewing chamber; introducing the heated water on an upper side of the brewing chamber; preparing the brewed beverage in the brewing chamber by filling the capsule with heated water; and after a brewing time, opening a valve on a bottom side of the brewing chamber on an outlet and filling a vessel with the brewed beverage.

In the apparatus in accordance with the invention, a positioning device is provided in order to position a capsule with an ingredient for brewing the beverage at a lateral opening of the brewing chamber, which is arranged above an outlet but beneath an inlet on an upper side of the brewing chamber. Hot water can be introduced via the inlet on the upper side of the brewing chamber, so that the capsule can be inserted without any damage for the brewing process. This prevents potential damage or leakage flows. The brewing volume can further be varied by the lateral positioning of the capsule on the brewing chamber and the supply of the hot water on an upper inlet because the degree of filling of the brewing chamber is not limited by the inlet. Handling is also simplified because the capsule is able to drop downwardly through an insertion chute in order to be positioned by a mechanical positioning means laterally on the brewing chamber. The used capsule can drop further in the downward direction after the brewing process and can be disposed of. Furthermore, the brewing chamber can be rinsed and cleaned in a better way.

According to a preferred embodiment of the invention, the volume of the brewing chamber is at least twice as large as the volume of the capsule, especially at least four times as large. The volume of the capsule lies in a range of between 20 ml and 100 ml for example. The volume of the brewing chamber without the capsule lies in a range of between 0.1 l and 1 l, preferably 0.15 l to 0.7 l. Tea can thus be prepared especially well in the brewing chamber, which needs to brew for a specific period of time in the brewing chamber. The volume of the capsule is preferably dimensioned in such a way that it is at least twice as large as the volume of the cut tea so that there is sufficient space for the swelling of the tea during the preparation.

A screen is preferably arranged between the brewing chamber and the interior space of the capsule. The screen can be provided both on the capsule and also the brewing chamber, wherein the arrangement on the capsule offers the advantage that the capsule is positioned as a unit on the brewing chamber and can be disposed of again, which simplifies cleaning.

A nozzle is provided in an advantageous embodiment on the inlet, which nozzle protrudes with a tip into an interior space of the brewing chamber. Several openings distributed over the circumference can be provided on the nozzle, so that the supply of hot water for the brewing process one the one hand and also for a rinsing process on the other hand is ensured. Furthermore, hot water for heating or warming up the brewing liquid can also be added.

According to a further embodiment, a drive device is provided by means of which the brewing chamber is movable. For the purpose of sealing an interface between the capsule and the brewing chamber, the brewing chamber can be moved in order to provide a sealing. Furthermore, the method of the brewing chamber is further advantageous if the displacement of the brewing chamber can be used in order to eject a capsule from the brewing position after use.

An outlet nozzle is preferably arranged in the brewing position above a passage for filling the vessel, e.g. a cup, and in a rinsing position spaced from the passage above a guide element for collecting rinsing liquid. The displacement of the brewing chamber can then be used to fill a vessel in a brewing position which is arranged beneath the passage. If cleaning of the brewing chamber is carried out after the brewing process, it is merely necessary to move the outlet nozzle from the passage to the guide element so that the rinsing water within the apparatus can be guided via the guide element to a collecting basin. The region of the brewing chamber and the guide element which is wetted by the tea is rinsed completely, which is especially hygienic.

The apparatus further preferably comprises a collecting container for waste. The collecting container is preferably arranged beneath the lateral opening of the brewing chamber, so that the capsule can drop into the collecting container during the displacement of the brewing chamber of the brewing process. Furthermore, rinsing liquid which emerges from the lateral opening of the brewing chamber can be diverted to the collecting container. A screen or a grate can be provided on the collecting container in order to collect used capsules above the collecting basin for liquid.

In the method in accordance with the invention, a capsule with an ingredient for brewing a beverage is positioned at first at a lateral opening of a brewing chamber in order to heat water and to convey the water to the brewing chamber. The heated water is then introduced on an upper side of the brewing chamber via an inlet and the beverage is prepared in the brewing chamber by filling the capsule with heated water. After a dwell time, i.e. the brewing or infusion time, which can be at least 30 seconds for example, preferably at least one minute, a valve on a bottom side of the brewing chamber on an outlet is opened and a vessel is filled with the brewed beverage. Gravity is thus used in the method in accordance with the invention in order to allow a pressureless preparation of a brewed beverage to be carried out without damaging the capsule, so that leakage flows can be avoided, irrespective of the filling volume of the brewing chamber.

The brewing chamber is preferably displaced after the brewing process in order to eject the capsule to a collecting container. The displacement of the brewing chamber can thus be used on the one hand for sealing the capsule and on the other hand for ejecting the capsule. Furthermore, the brewing chamber can be displaced together with an outlet nozzle in order to move the outlet nozzle from a filling position above the passage to a vessel in a rinsing position above a guide element in order to then rinse the brewing chamber.

In the method in accordance with the invention, the capsule preferably comprises a coding or marking which is read out after the positioning of the capsule. A controller of the apparatus can then control the preparation parameters such as brewing temperature, infusion time and/or filling volume according to the marking.

Tea is preferably prepared in the method in accordance with the invention as a brewed beverage. It is obviously also possible to prepare other brewed beverages, especially brewed beverages which require a specific brewing time.

BRIEF DESCRIPTION OF THE DRAWINGS

The invention will be explained below in closer detail by reference to an embodiment shown in the enclosed drawings, wherein.

DETAILED DESCRIPTION OF THE INVENTION

Figure 1:
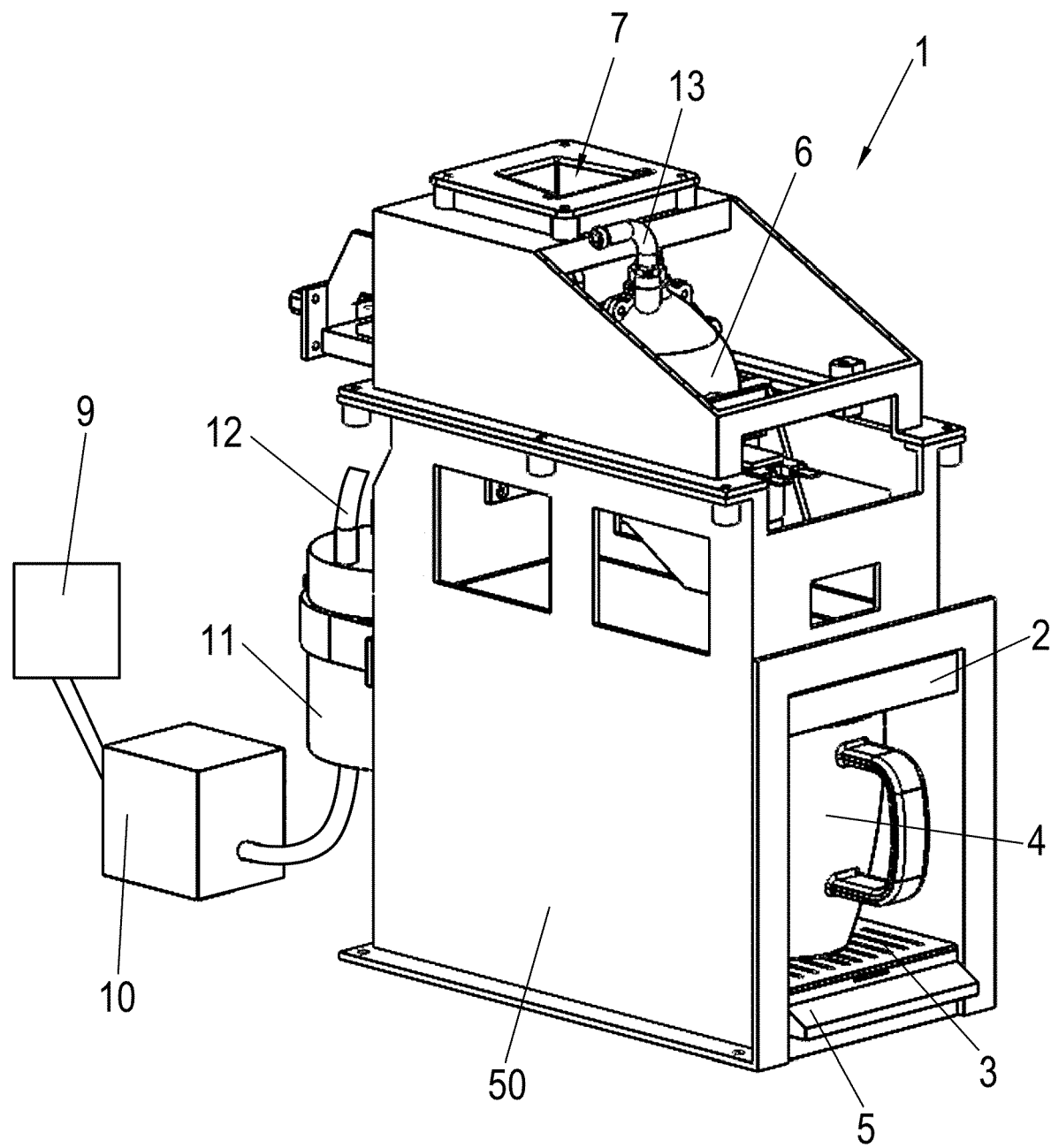
FIG. 1 shows a perspective view of an apparatus for preparing a brewed beverage.

An apparatus 1 for preparing brewed beverages comprises a removable collecting container 2 which is arranged in a housing 50. The collecting container 2 preferably consists of two parts: a container with a water-permeable base for accommodating capsules and a container underneath for collecting water. A support 3 with openings for depositing a vessel 4 is arranged on the collecting container 2. A gripping section 5 for pulling out the collecting container 2 is provided beneath the support 3.

The apparatus 1 for preparing brewed beverages further comprises a brewing chamber 6, which is provided adjacent to an insertion chute 7 for capsules.

Figure 2:
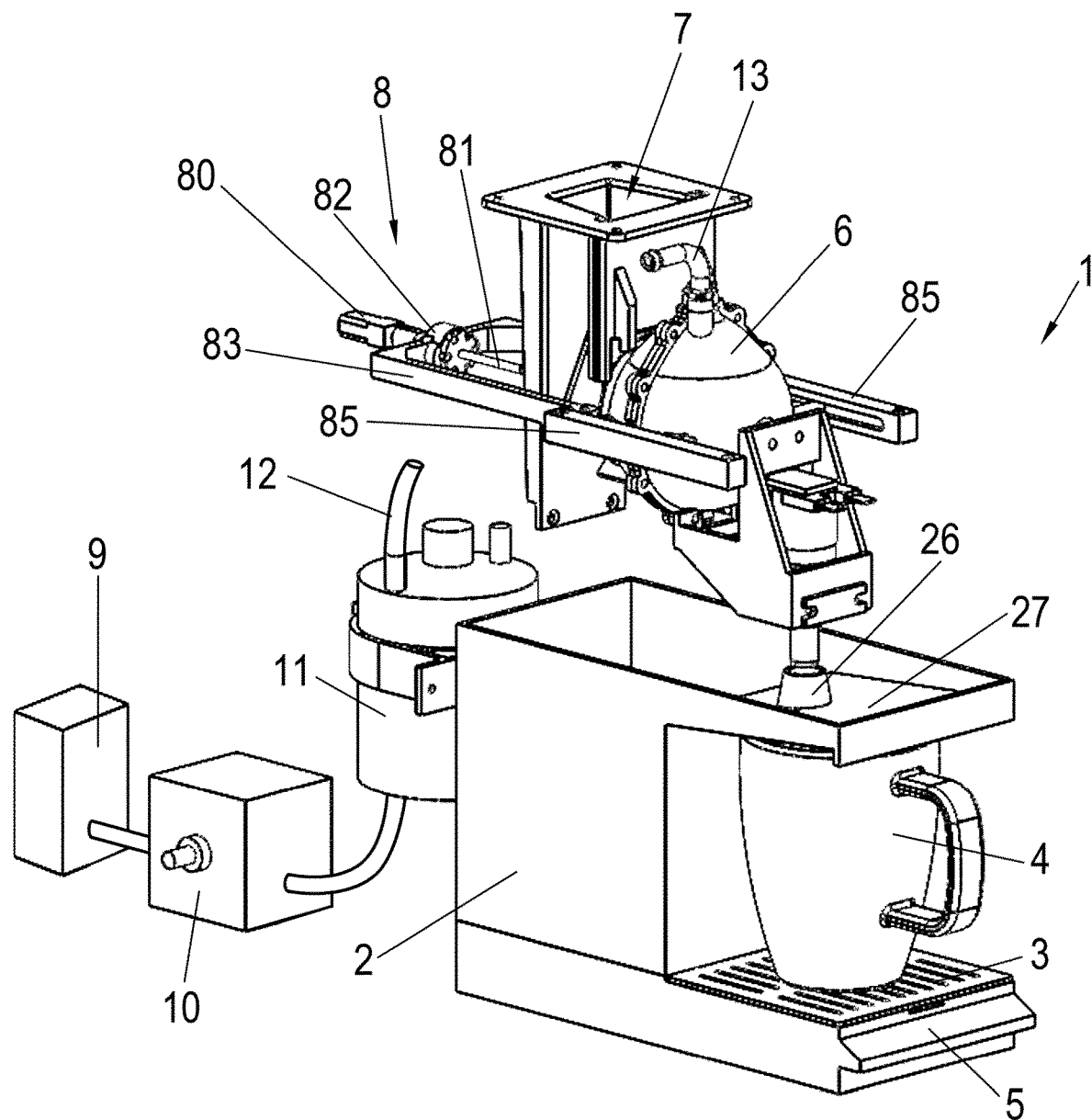
FIG. 2 shows a perspective view of the apparatus of FIG. 1 without the housing.

As is shown in FIG. 2, the insertion chute 7 for capsules is disposed between the brewing chamber 6 and a drive device 8. The brewing chamber 6 can be moved relative to the insertion chute 7 via the drive device 8. An electric motor 80 is provided for this purpose, which drives a spindle 81 via a gear, on which spindle a spindle nut 82 is mounted in a torque-proof manner. Arms 83 which are connected to the spindle nut 82 are displaced linearly by rotation of the spindle 81. The arms 83 engage around the brewing chamber 6 on opposite sides and are guided on linear guides 85. The guide 85 can be formed as a groove or rail for example. The brewing chamber 6 is thus linearly movable.

The apparatus 1 for preparing brewed beverages further comprises a schematically shown tank 9 for freshwater, which can be formed in a removable manner. The tank 9 is provided with a pump 10, via which a heating device 11 in form of a boiler is supplied. A line 12, which is only partly shown in FIG. 2, leads from the heating device 11 to an inlet line 13 above the brewing chamber 6. A filter can optionally also be provided between the inlet line 13 and the tank 9.

Figure 3:
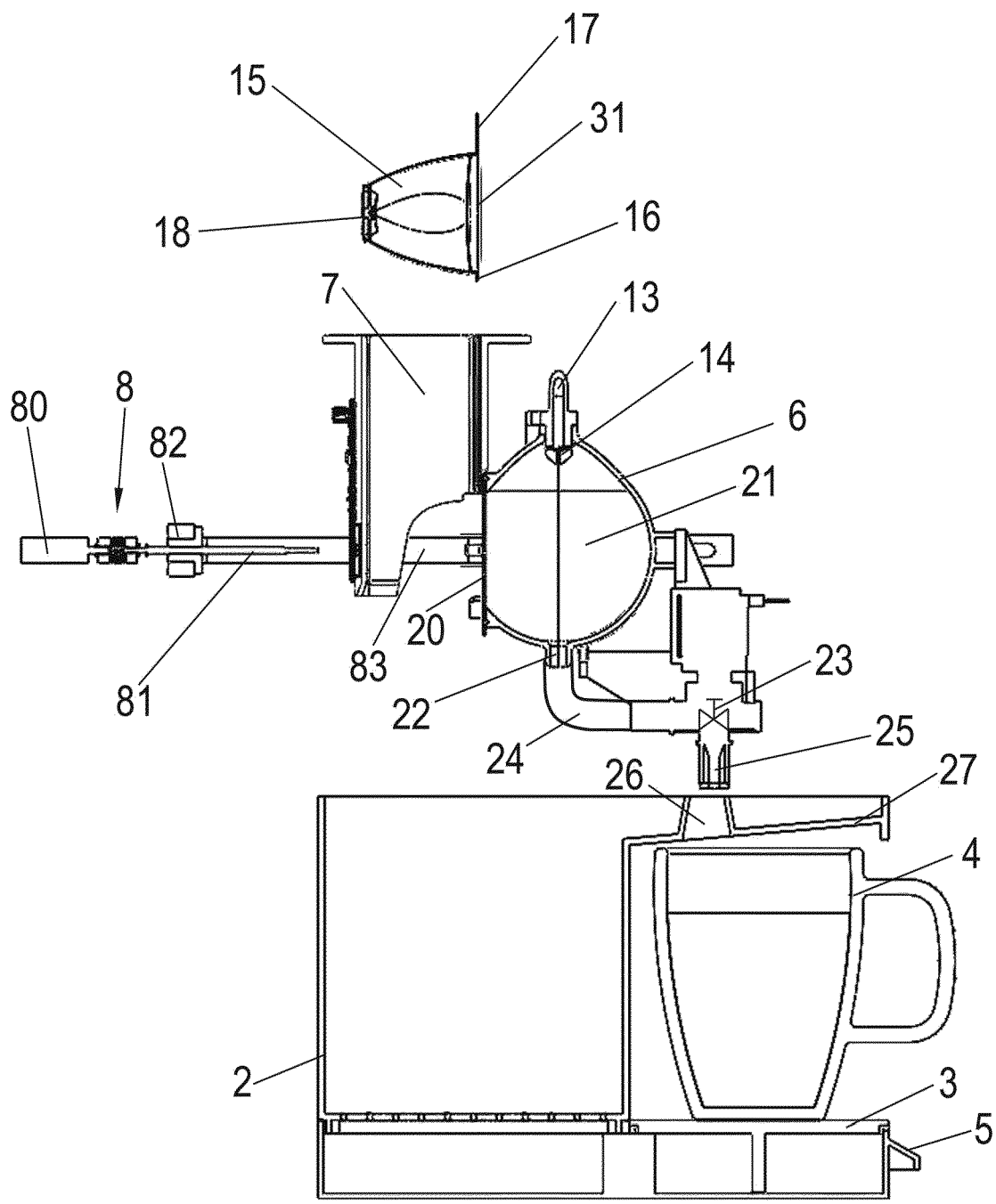
FIG. 3 shows a sectional view of the apparatus of FIG. 1 without the housing prior to the insertion of the capsule.

FIG. 3 shows the apparatus 1 in detail. A capsule 15 is provided above the insertion chute 7, which capsule is formed in a cup-like manner and comprises an opening on one side which is sealed with a screen 31. The screen 31 is fixed to an edge 16 which is formed in an asymmetric manner and comprises a protruding section 17 as a gripping region. As a result of guide means on the base of the capsule 15 which are also asymmetric, said capsule is thus inserted in a predetermined position and orientation into the insertion chute 7, which comprises a respective recess with guide means for the positioning of the capsule 15. On the side opposite the opening, the capsule 15 comprises a base 18 on which markings are arranged for identifying the capsule 15. Such markings can be formed as a colour coding, an optical coding, an electromagnetic coding or in any other way in order to identify a specific type of capsule in a predetermined position. By reading the coding of the capsule 15 on the apparatus, the filling quantity of hot water for the brewing chamber 6, the temperature and the brewing time can be set via the controller. The control of other parameters via the coding is also possible.

Figure 4:
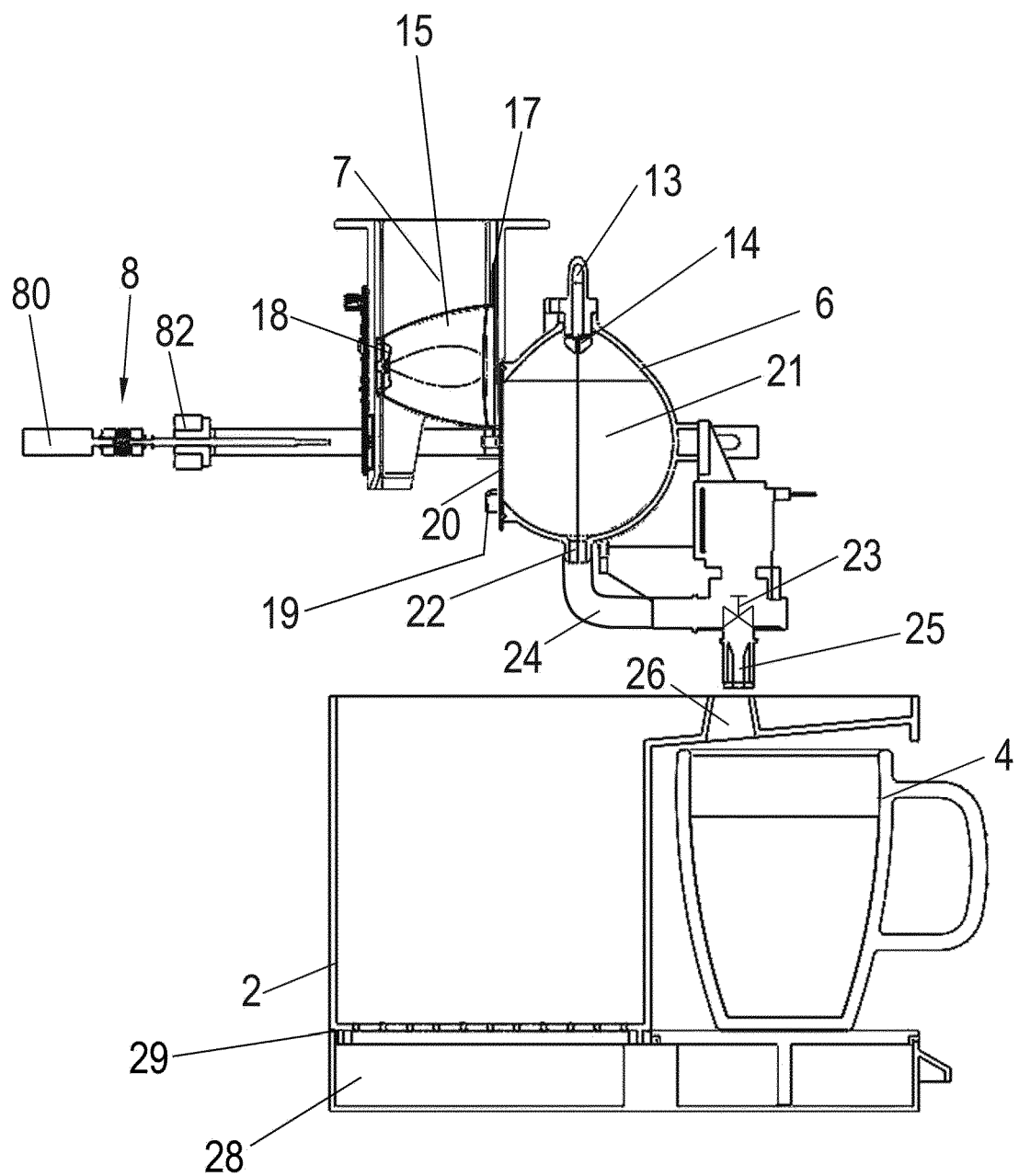
FIG. 4 shows a sectional view of the apparatus of FIG. 1 without the housing during insertion of the capsule.
Figure 5:
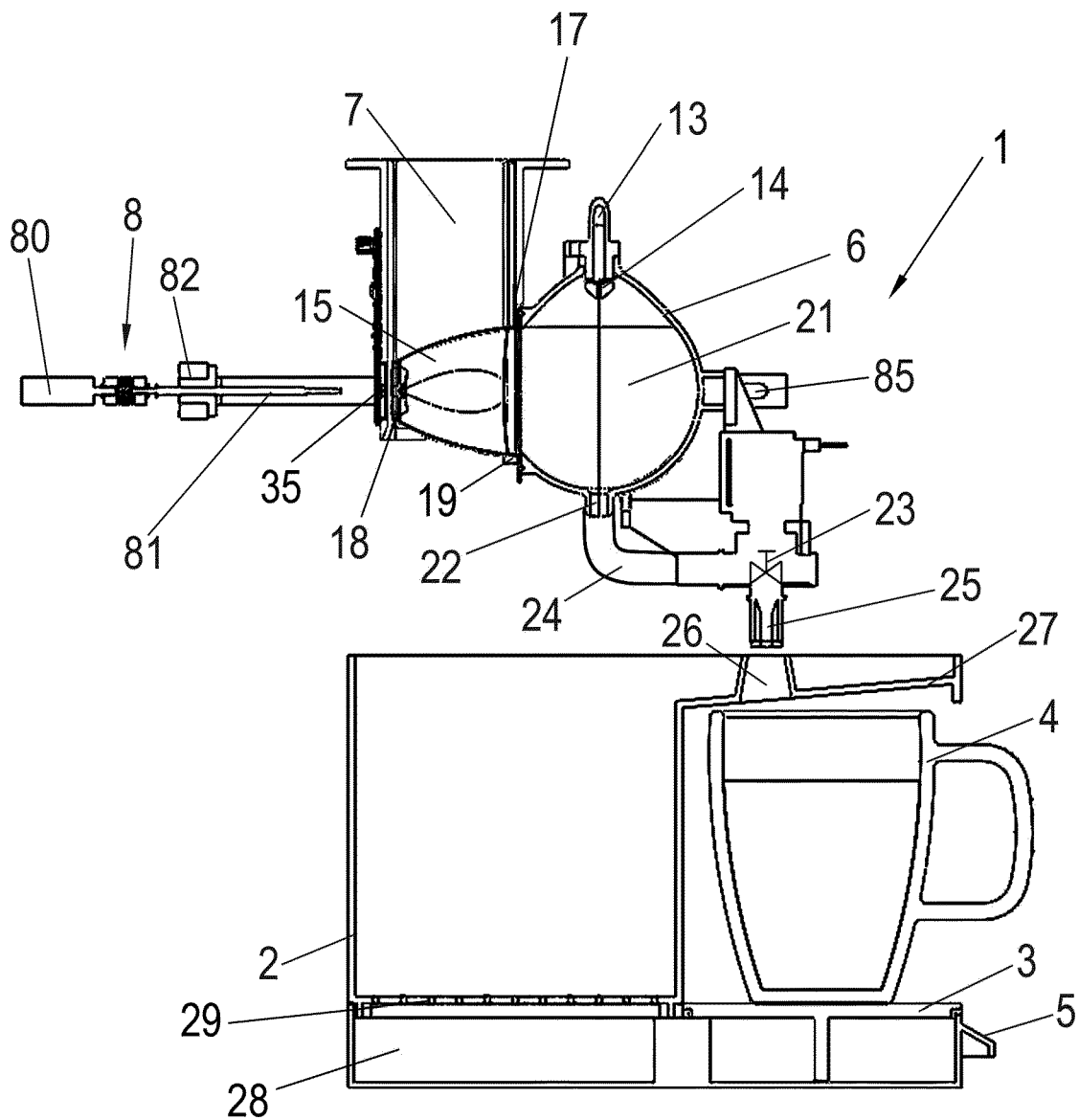
FIG. 5 shows a sectional view of the apparatus of FIG. 1 with the capsule in the brewing position.

The capsule 15 is inserted at first into the insertion chute 7 for the brewing process, as shown in FIG. 4. The capsule 15 slides downwardly until it is arranged at a lateral opening 20 of the brewing chamber 6. Retainers 19 are provided for this purpose on the exterior side of the brewing chamber 6, which retainers prevent that the capsule 15 slips in the downward direction beyond the position shown in FIG. 5. FIG. 5 shows the brewing position to which the brewing chamber 6 is moved after the insertion of the capsule 15. The spindle 81 is twisted for this purpose by the electric motor 80 in order to move the arms 83 along the guide 85 in FIG. 5 to the left, and in order to thus press a seal adjacent to the opening 20 at the brewing chamber 6 against the edge 16 of capsule 15 and to ensure sealing. The capsule 15 and an interior space 21 of the brewing chamber 6 thus form a unit, wherein the interior space 21 of the brewing chamber 6 and the interior of the capsule 15 are separated from each other by the screen 31. The interior space 21 of the brewing chamber 6 is several times larger than an interior space of the capsule 15, e.g. more than four times as large, so that the brewing beverage is mainly disposed in the brewing chamber 6 and only a minor portion in the capsule 15, which simplifies the dispensing of the brewing beverage.

In the brewing position, hot water is introduced via the inlet line 13 from the heating device 11 into the brewing chamber 6, for which purpose a nozzle 14 is provided at the end of the inlet line 13 which protrudes with a tip into the interior space 21 of the brewing chamber 6. The brewing chamber 6 comprises an outlet 22 at the bottom end, which outlet is connected via a line 24 to a valve 23. The introduced hot water is collected in the brewing chamber 6 by closing the valve 23 and rises over the outlet 22 in order to reach the material contained in the capsule 15 for brewing a beverage, especially tea. The preparation of the brewed beverage can be adjusted individually via the controller by previous reading of the coding on the capsule 15 via a reader device 35, e.g. green tea can be prepared differently than black tea, fruit tea or any other brewed or infusion beverage. Furthermore, a cleaning or service program can be started by reading the coding.

The valve 23 can be opened after the brewing process so that the brewed beverage flows from the brewing chamber 6 via the outlet 22 and the line 24 into an outlet nozzle 25, from where it is introduced into a vessel 4. A passage 26 or an opening is disposed between the outlet nozzle 25 and the vessel 4, so that the hot beverage can flow without obstruction into the vessel 4. The valve 23 can be closed again after the preparation of the brewed beverage.

Figure 6:
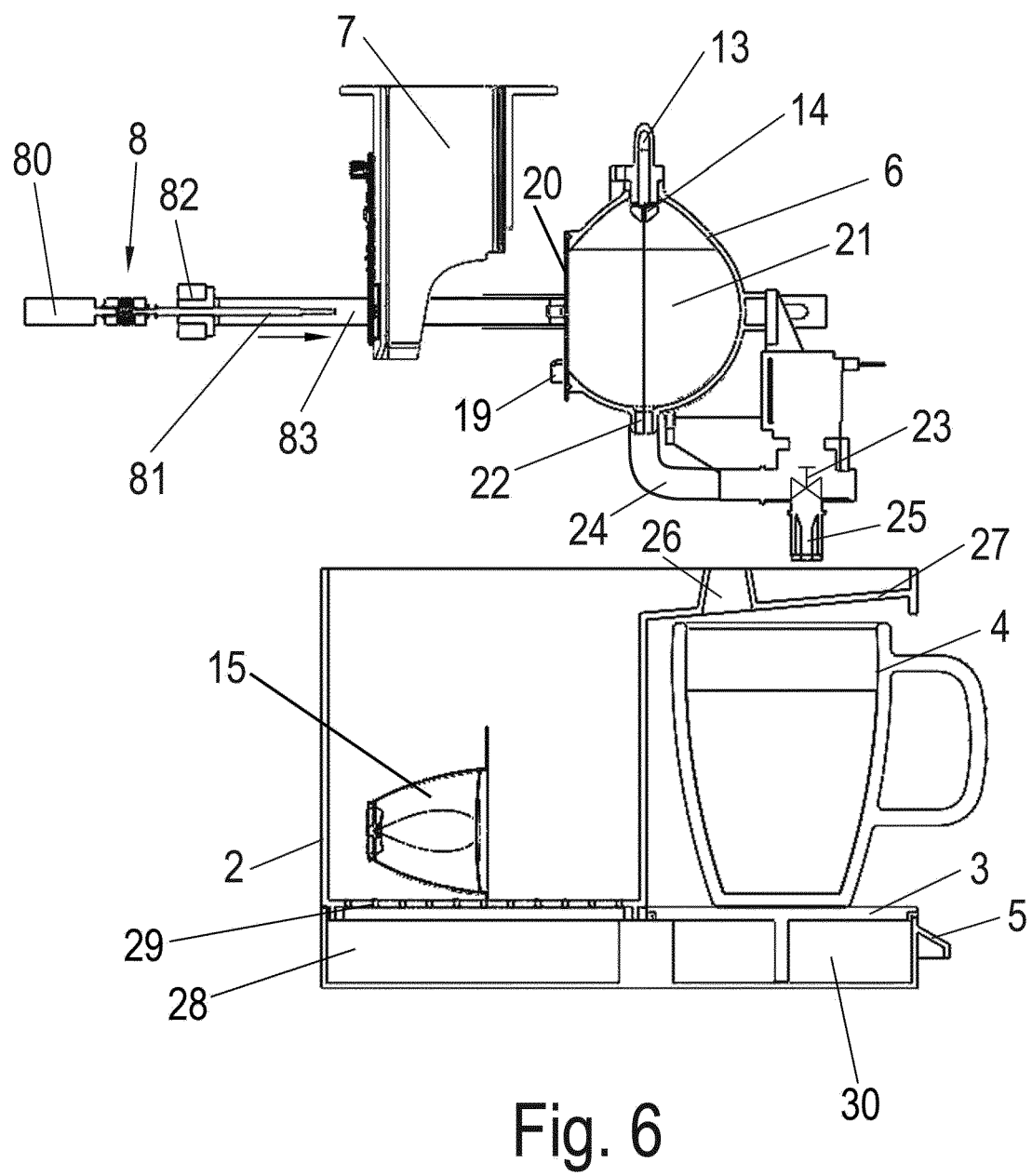
FIG. 6 shows a sectional view of the apparatus of FIG. 1 after the ejection of the capsule in a rinsing position.

After the brewing process, the brewing chamber 6 can be displaced via the drive device 8 according to the arrow in FIG. 6 so that the capsule 15 is removed from the holding position adjacent to the lateral opening 20 on the brewing chamber 6 and drops in the downward direction. The capsule 15 drops into the collecting container 2 and onto a screen 29 or a grate which is arranged above a collecting basin 28. The displacement of the brewing chamber 6 simultaneously also displaces the line 24 and the outlet nozzle 25, which is now no longer arranged above the passage 26 but above a guide element 27. The brewing chamber 6 can now be rinsed, in that hot water is injected from the heating device 11 via the nozzle 14 into the brewing chamber 6, so that the hot water can remove residues of the brewing process. The hot water can be partly introduced through the opening 20 into the collecting container 2 in a direct manner and is introduced otherwise via the outlet 22 and the line 24 into the outlet nozzle 25. The rinsing water then reaches the guide element 27 from there, which is formed as a sloping surface above the vessel 4. The rinsing water reaches the collecting basin 28 of the collecting container 2 via the guide element 27. The guide element 27 can also be formed as a channel or a groove instead of a sloping surface.

If after the removal of the vessel 4 a small quantity of liquid is introduced through the passage 26, then this liquid can be collected in a second collecting basin 30 or a drip tray beneath the screen 31. The collecting container 2 can be removed as a unit from the housing 50 of the apparatus 1 so that the two collecting basins 28 and 30 on the collecting container 2 can be emptied. Furthermore, the collecting container 2 above the screen 29 is removable so that the used capsules 15 can also be emptied in a simple way.

Figure 7:
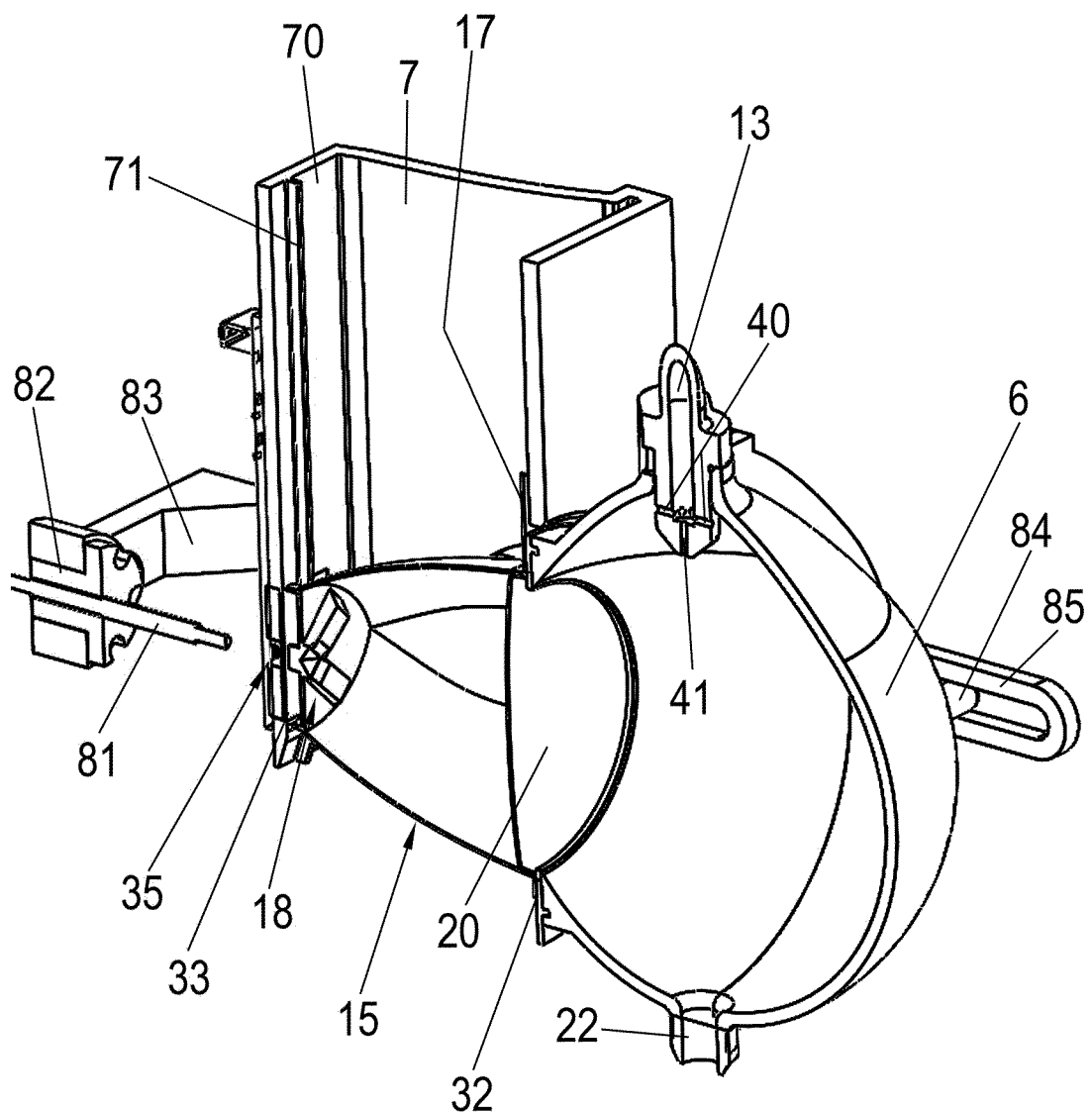
FIG. 7 shows a perspective detailed view of the brewing chamber of the apparatus of FIG. 1 with the capsule in the brewing position.

FIG. 7 shows the brewing chamber 6 in detail. The nozzle 14 is situated on the upper side of the brewing chamber 6, by means of which hot water is introduced for the brewing process or for the rinsing process. For this purpose, the nozzle 14 comprises several openings 40 which are distributed over the circumference, through which the hot water can be injected into the brewing chamber 6. A liquid film is thus formed on the side walls of the brewing chamber 6, which can be used on the one hand for rinsing and on the other hand for the brewing process. Furthermore, an opening 41 is provided downwardly on the nozzle 14 through which hot water can be injected, e.g. when hot water needs to be refilled during the brewing process. The openings 40 and 41 can also be formed to be optionally switchable via valves. Alternatively, the opening 41 can also be formed in the direction of the capsule instead of perpendicularly in the downward direction.

The brewing chamber 6 is formed in a substantially spherical way and comprises a parabolic section in the upper region on which the nozzle 14 is provided.

The brewing chamber 6 comprises retainers 84 or pins on its exterior side which are mounted in the guide 85.

The brewing chamber 6 can accommodate a volume of between 0.1 l to 1.0 l, especially 0.15 l to 0.7 l, depending on the number of portions of the brewed beverage that need to be prepared at once.

Figure 8:
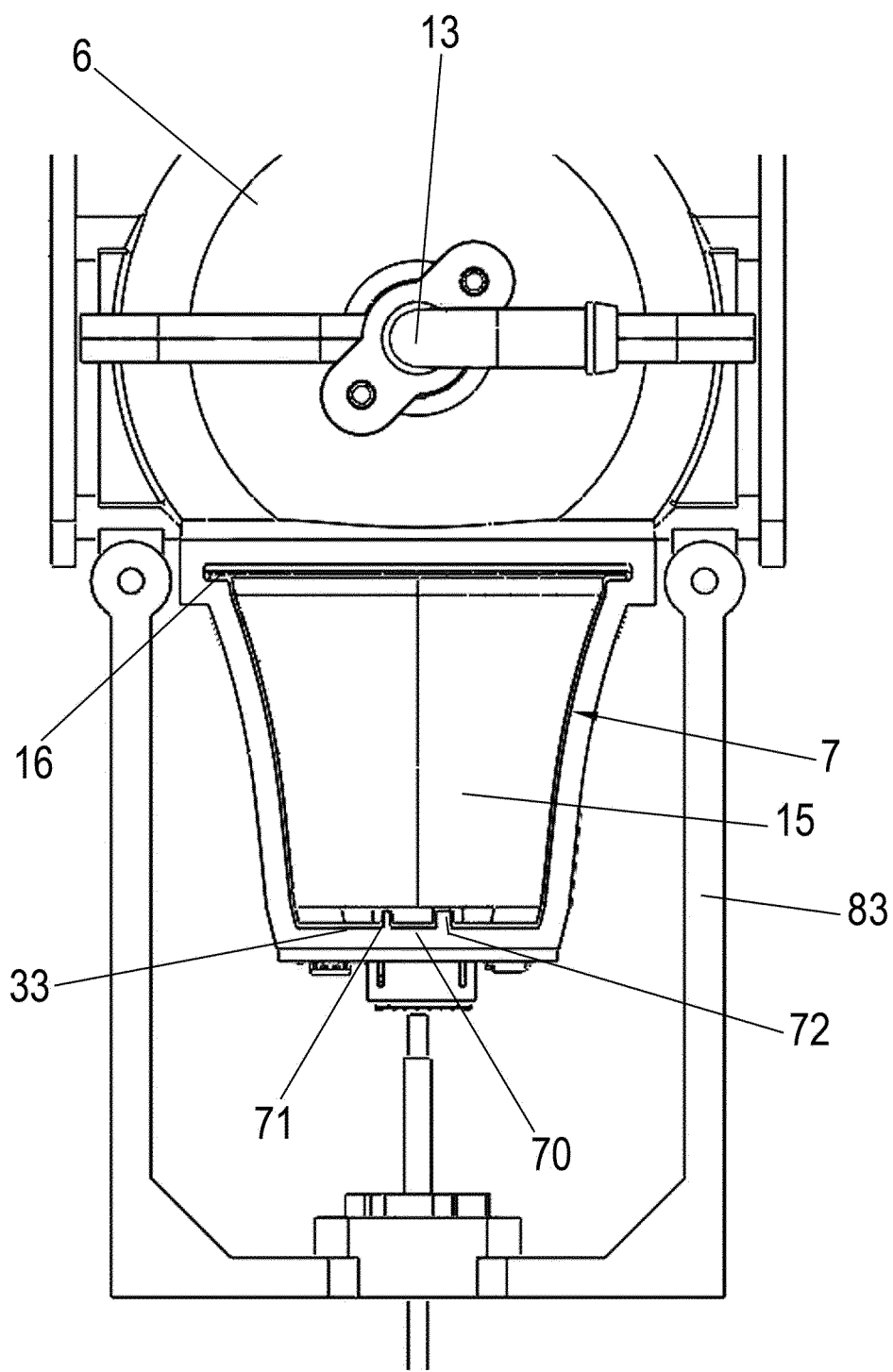
FIG. 8 shows a top view of the insertion chute of the apparatus of FIG. 1.

Furthermore, FIGS. 7 and 8 show that the insertion chute 7 comprises a surface 70 on the side of the base 18 of the capsule 15, from which a first guide strip 71 and a second guide strip 72 protrude. The guide strips 71 and 72 have a different width and are arranged asymmetrically in relation to a central plane of the capsule 15 so that the capsule 15 can only be inserted into the insertion chute 7 in a predetermined position.

A base area 33 with grooves for accommodating the guide strips 71 and 72 are provided at the height of the lateral opening 20 adjacent to the base 18 of the capsule 15, on which the capsule 15 is supported after insertion when the capsule 15 rests on the positioning means 19. It is thus prevented in the insertion position and the brewing position that the capsule 15 can drop into the insertion chute 7. If the brewing chamber 6 is moved after the brewing process and moved away from the insertion chute 7, the capsule can drop downwardly into the collecting container 2 as a result of gravity. It may occur that the capsule 15 attaches with the edge 16 to an annular seal 32 on the brewing chamber 6 and is moved together with the brewing chamber 6. In order to definitely ensure a detachment of the capsule 15, a stop can be arranged in the path of displacement of the capsule, e.g. an upwardly protruding section 17, so that the capsule 15 is released from the brewing chamber 6 after a specific amount of travel and it is ensured that the capsule 15 drops into the collecting container 2.

It is ensured by the electrical drive device 8 that the capsule 15 can be ejected automatically. A rinsing process can thus be initiated after each brewing process, so that it is prevented that the surface of the brewing chamber 6, the outlet 22 and the line 24 are soiled. The rinsing can be carried out automatically within 30 seconds for example after the brewing process, without the user having to trigger the rinsing process.

Other drive devices can also be used instead of the illustrated drive device 8 with the spindle 81, which other drive devices linearly move or also pivot the brewing chamber 6. The brewing chamber 6 can also be moved along a curve guide for example so as to be moved between an insertion position, a brewing position and an ejection or rinsing position.

Figure 9:
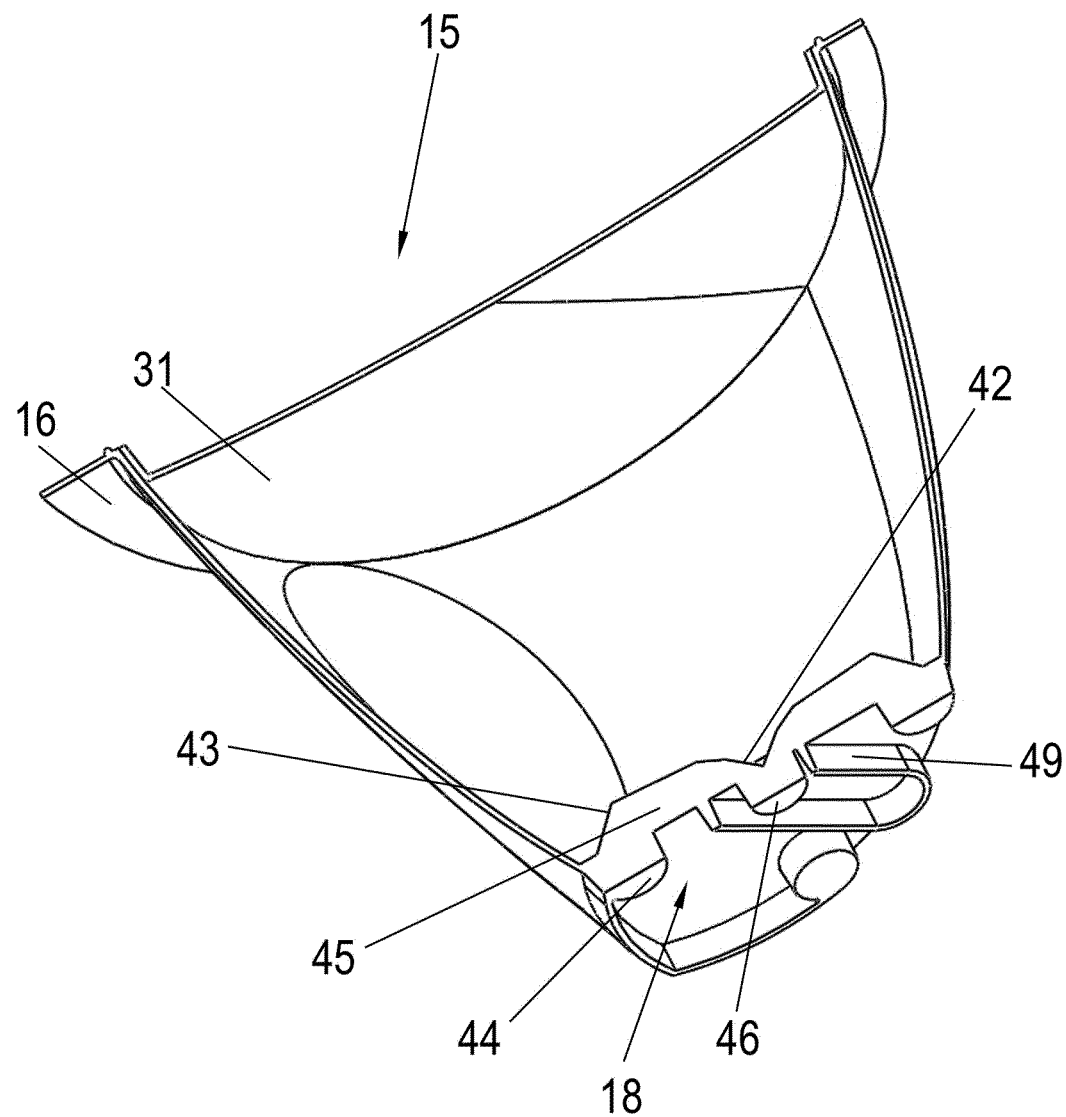
FIG. 9 shows a sectional perspective view of the capsule.

The capsule 15 is shown in FIG. 9 in a sectional view. It comprises an interior space which is sealed by a screen 31 or a grate. In order to maintain the aroma of the contents of the capsule over a longer period of time, the screen 31 or the grate can be sealed with a cover foil, which is removed entirely or partly prior to the insertion into the insertion chute 7. At least one light injection surface 46, at least one light deflection apparatus 42 and 43 and at least one light-output surface 44 are provided, which are used for an optical recognition system. Light conductors 45 are formed for this purpose on the base 18. A protruding guide profile 49 is further formed on the base, which interacts with the guide strips 71 and 72. Four light-output surfaces 44 are provided in the illustrated embodiment, on which a respective light detector detects or also does not detect the emission of light. This leads to four types of coding on the base 18 of the capsule 15, so that 16 different types of capsules can be recognised. It is obviously also possible to vary the number of the light-output surfaces 44 and the light detectors 36. It is also possible to arrange the light sources and light sensors in a different way, so that the light-output surfaces 44 become the light injection surfaces and the middle light injection surface 46 becomes a light-output surface.

Figure 10:
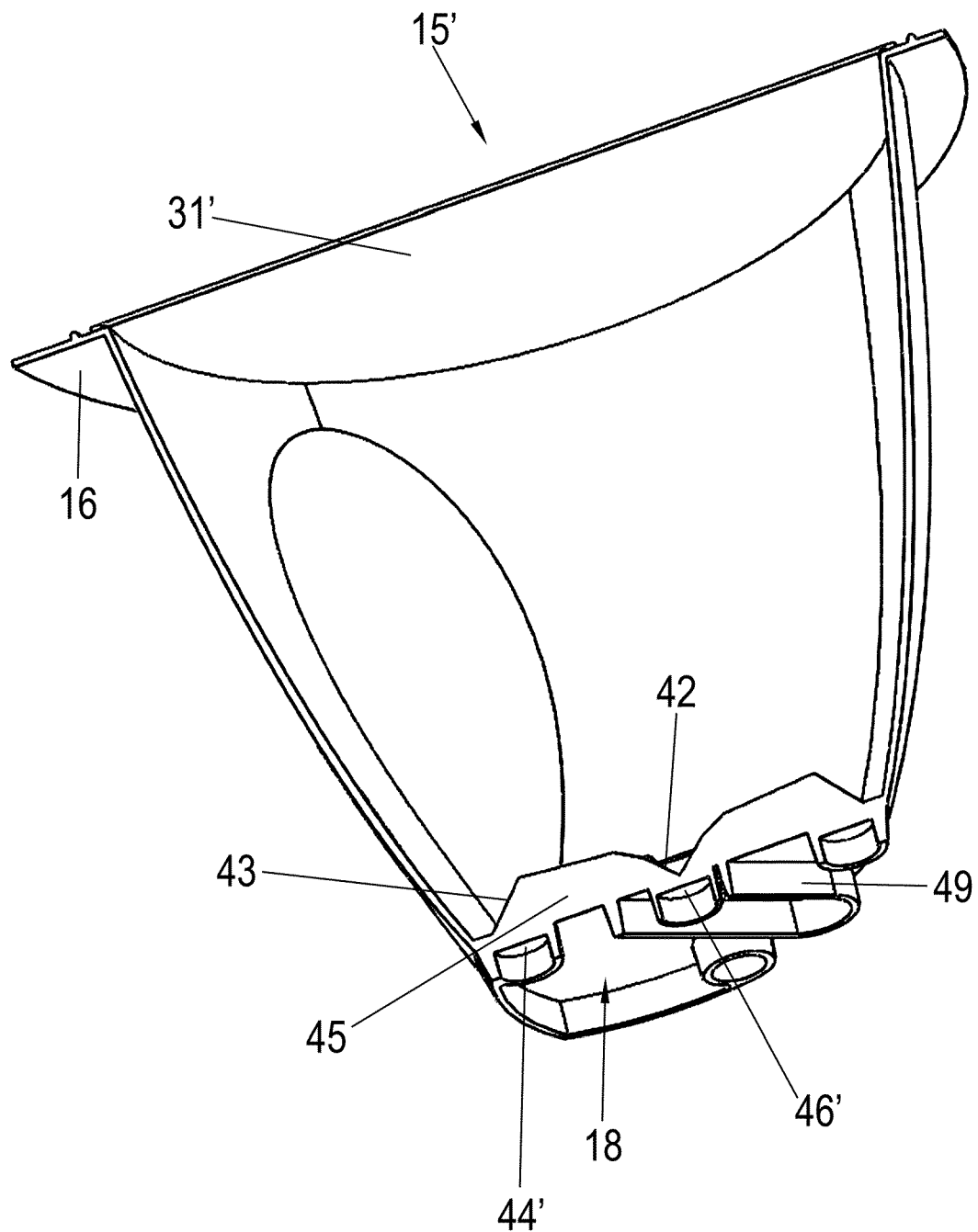
FIG. 10 shows a sectional perspective view of a further embodiment of the capsule.

FIG. 10 shows an embodiment of a capsule 15' which is modified over that of FIG. 9. Capsule 15' comprises four light-output surfaces 44' and one light injection surface 46' on the base, which are each arranged in a protected way in a cup-shaped receptacle. The light-output and light injection surfaces 44' and 46', which are oriented parallel to the surface of the base 18, are thus arranged in a protective manner by a downwardly protruding ring. Furthermore, a screen 31' is fixed to the upper edge 16 of the capsule 15'.

In the illustrated embodiment, the brewing chamber 6 is formed with a single wall, e.g. made of plastic, metal or glass. It is also possible to insulate the brewing chamber 6 for the purpose of increasing temperature stability, e.g. with a casing made of insulating material or by a formation with a double wall. In this case, the brewed beverage can also be output in a sufficient tempered manner even in the case of long brewing times of more than 5 minutes for example.

LIST OF REFERENCE NUMERALS

1 Apparatus
2 Collecting container
3 Support
4 Vessel
5 Gripping section
6 Brewing chamber
7 Insertion chute
8 Drive device
9 Tank
10 Pump
11 Heating device
12 Line
13 Inlet line
14 Nozzle
15 Capsule
16 Edge
17 Section
18 Base
19 Retainer
20 Opening
21 Interior space
22 Outlet
23 Valve
24 Line
25 Outlet nozzle
26 Passage
27 Guide element
28 Collecting basin
29 Screen
30 Collecting basin
31 Screen
32 Seal
33 Projection
35 Reader device
40 Opening
41 Opening
42 Light deflection apparatus
43 Light deflection apparatus
44 Light injection surface
45 Light conductor
46 Light-output surface
49 Guide profile
50 Housing
70 Surface
71 Guide strip
72 Guide strip
80 Electric motor
81 Spindle
82 Spindle nut
83 Arm
84 Retainer
85 Guide

The invention claimed is:

1. An apparatus for preparing a brewed beverage, comprising:
a device to produce and convey heated water;
a brewing chamber including a lateral opening, a bottom side and an upper side including an inlet coupled to the device to produce and convey heated water through which the heated water is introduced into the brewing chamber for preparing the brewed beverage and for rinsing the brewing chamber;
a positioning device for positioning a capsule with an ingredient for brewing a beverage at the lateral opening of the brewing chamber, wherein the capsule has a water permeable side surrounded by an edge which faces the lateral opening when the capsule is positioned at the lateral opening, wherein the apparatus is absent any device to extend through any portion of the capsule while the capsule is positioned at the lateral opening of the brewing chamber for preparing the brewed beverage and the lateral opening is the only path for liquid in and out of the capsule;

an electrically driven drive device coupled to the brewing chamber to move the brewing chamber between 1) a brewing position to press a seal adjacent the lateral opening of the brewing chamber against the edge of the water permeable side of the capsule and 2) a rinsing position remote from the positioning device;

an outlet including a switchable valve on the bottom side of the brewing chamber for controlling a flow of brewed beverage and a flow of rinsing liquid, a vertically extending passage arranged to pass brewed beverage into a vessel;

a collecting container;

a guide element constructed and arranged to collect and guide rinsing liquid to the collecting container; and an outlet nozzle coupled to the outlet and arranged above the vertically extending passage when the brewing chamber is in the brewing position and arranged spaced away laterally from the vertically extending passage and above the guide element to dispense rinsing liquid to the guide element when the brewing chamber is in the is in the rinsing position.

2. The apparatus according to claim 1, wherein the brewing chamber has a volume that is at least twice as large as a volume of the capsule.

3. The apparatus according to claim 1, further including a screen arranged between an interior space of the brewing chamber and an interior space of the capsule.

4. The apparatus according to claim 1, wherein the device to produce and convey heated water includes an inlet nozzle having a plurality of openings distributed over a circumference on the inlet on the upper side of the brewing chamber.

5. The apparatus according to claim 4, wherein the inlet nozzle has a tip and protrudes with the tip into an interior space of the brewing chamber.

6. The apparatus according to claim 1, wherein the lateral opening of the brewing chamber is arranged above the collecting container.

7. The apparatus according to claim 6, wherein the collecting container comprises a collecting basin for liquid and a grate or screen above the collecting basin to collect used capsules in a space of the collecting container above the collecting basin.

8. A method for preparing a brewed beverage employing the apparatus according to claim 1, comprising the following steps:

positioning the capsule with the ingredient for brewing the beverage at the lateral opening of the brewing chamber;

heating water and conveying the heated water to the brewing chamber;

introducing the heated water on the upper side of the brewing chamber;

preparing the brewed beverage in the brewing chamber by filling the capsule with heated water without any device to extend through any portion of the capsule; and after a brewing time, opening the valve on the outlet on the bottom side of the brewing chamber for filling the vessel with the brewed beverage.

9. The method according to claim 8, including, subsequent to the opening step, moving the brewing chamber to eject the capsule to the collecting container.

10. The method according to claim 8 including, subsequent to the opening step, moving the brewing chamber together with the outlet nozzle in order to move the outlet nozzle from the brewing position above the passage for filling the vessel to the rinsing position above the guide element arranged to guide rinsing liquid from the outlet nozzle, and then rinsing the brewing chamber.

11. The method according to claim 8, further including reading a coating or marking on the capsule after the positioning of the capsule, and then controlling, with a controller, preparation parameters for preparing the brewed beverage according to information read from the coding or marking.

12. The method according to claim 8, wherein the capsule in the positioning step contains tea, and the preparing step includes brewing tea in the brewing chamber and capsule.

13. The apparatus according to claim 2, wherein the volume of the brewing chamber is at least four times the volume of the capsule.

* * * * *